June 8, 1965     E. RIBBACK     3,187,547

HYDRAULIC PRESS

Filed Sept. 4, 1962

INVENTOR.
Erich Ribback

BY

Michael S. Striker
Atty.

United States Patent Office 3,187,547
Patented June 8, 1965

3,187,547
HYDRAULIC PRESS
Erich Ribback, Kellereistrasse 1, Grevenmacher, Luxembourg
Filed Sept. 4, 1962, Ser. No. 221,086
Claims priority, application Luxembourg, Sept. 11, 1961, 40,587
8 Claims. (Cl. 72—402)

The invention relates to a hydraulic press which employs pairs of tools moving against one another. In known constructions of hydraulic presses the tool drive is connected to the working piston which moves in the working cylinder disposed above the machine table supporting the anvil. Usually the working cylinder and also the machine table are supported by means of a U-shaped machine column. Such known constructions of hydraulic presses have several disadvantages, e.g. great overall heights are necessary because of the construction, the center of gravity of the oscillating masses is located at great height, great weight is indispensable, and the view of the work area is very bad.

The high weight in such prior constructions results from the fact that the working pressures act on the free ends of the machine column which must be of especially robust construction to withstand the unfavourable bending stresses. Furthermore, only two tools, usually vertically arranged, can act on the workpiece, i.e. the tool acting as anvil and situated on the machine table, and the tool carried by the support.

It is an object of the invention to eliminate these difficulties and disadvantages. According to a particular feature of the invention, part of a machine performing the vertical operating stroke is arranged underneath the machine table and is designed to serve as a bearing surface for the tool support.

The subject of the invention is diagrammatically shown by way of an example in the drawing, in which.

Figure 2:
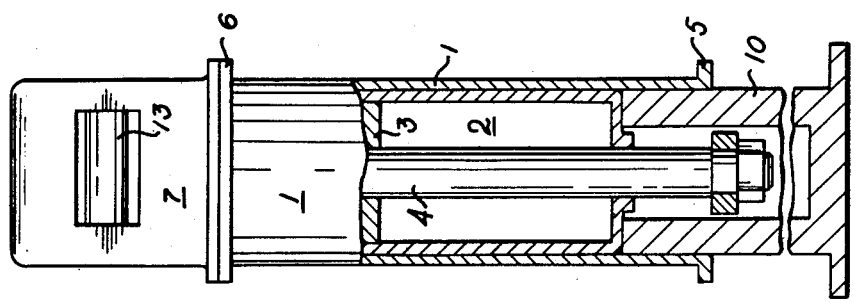
FIG. 2 is a longitudinal view, partly in section of the subject of FIG. 1 turned through 90°.
Figure 1:
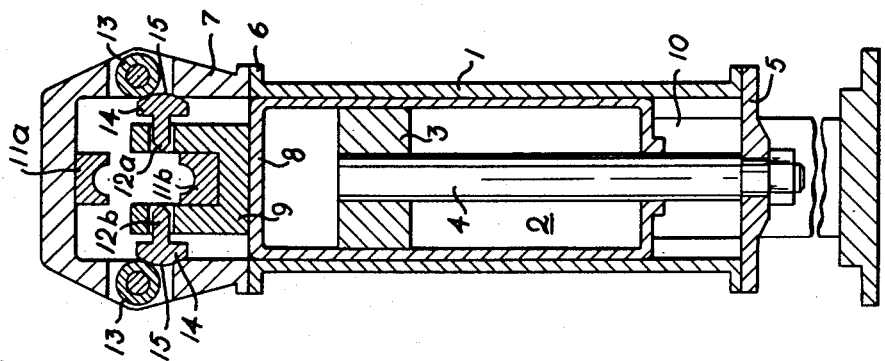
FIG. 1 shows a longitudinal section through a hydraulic press according to the invention.

As represented in the drawing the reciprocating member 1 of the machine performing working stroke is constructed cylindrically and is slidably guided on the stationary working cylinder 2 in which the working piston 3 moves. The working piston 3 and the member 1 are connected by the piston rod 4 and a bracket 5 or the like.

Reciprocating member 1 comprises an upper portion 6 which is formed as a bearing surface and carries the tool holder 7 which is fixed thereon in an easily detachable manner by means of screws or the like (not shown). The working cylinder 2 supports on its upper portion 8 the machine table 9; its lower portion 10 is constructed as a machine column adapted to engage a floor.

The tool holder 7 arranged on member 1 and the machine table 9 arranged on the stationary working cylinder 2 support pairs of tools 11a, 11b and 12a, 12b. In the example shown in the drawing the pairs of tools 11a, 11b, 12a, 12b form respective crosses with one another which lie in respective horizontal and vertical planes.

The tool holder 7 carries only the uppermost tool 11a and serves to move the horizontal tools 12a, 12b relative to one another, the lower tool 11b is secured to the machine table 9. During each vertical working stroke of the uppermost tool 11a each of the horizontal tools 12a and 12b is reciprocated horizontally, that is during each stroke and before the uppermost tool 11a is actuated, the horizontally movable tools 12a and 12b are pushed toward each other by pressure means 13 and are returned to their original position by means of an accumulator not represented in the drawing. In so actuating the tools, the pressure means 13 during its actuating stroke slides vertically over the heads 14 of the horizontal tools 12a, 12b. It is advantageous to construct the pressure means 13 in the form of rollers pivotally secured to the tool holder 7.

As shown in the drawing the heads 14 of the horizontal tools 12a, 12b each have a camming surface 15 engaged by the pressure means 13 during their actuating stroke. By giving the tool heads 14 camming surfaces of different shapes it is possible to vary the motions of the tools 12a, 12b as desired. The shape of surface 15, it will be understood, controls the speed and the length of the reciprocating stroke of tools 12a, 12b in the machine table 9.

The hydraulic press according to the invention is particularly advantageous for shaping operations in connection with the reducing of pipe ends. During each stroke the end of a pipe disposed on the lower tool 11b will first be compressed horizontally by the reciprocating horizontal tools 12a, 12b which are then restored to their original positions by the accumulator before the upper tool 11a carried by the tool support 7 begins to deform the edge portion of the pipe vertically against the lower tool 11b.

Having thus described my invention, what I claim and desire to secure by Letters Patent, is:

1. A hydraulic press comprising, in combination, cylinder means having opposite ends and adapted to be fixedly mounted on one of its ends; a piston reciprocable in said cylinder means; a stationary tool fixedly mounted on the other end of said cylinder means; a movable tool arranged opposite said stationary tool; and connecting means connecting said piston to said movable tool for reciprocating the latter toward and away from said stationary tool during reciprocation of said piston, said cylinder means forming the only support of said hydraulic press.

2. A hydraulic press comprising, in combination, upright cylinder means having a lower end adapted to be fixedly mounted on a floor and an upper end; a piston reciprocable in said cylinder means; a stationary tool fixedly mounted on the upper end of said cylinder means; a movable tool arranged opposite said stationary tool; and connecting means connecting said piston to said movable tool for reciprocating the latter toward and away from said stationary tool during reciprocation of said piston, said cylinder means forming the only support of said hydraulic press.

3. A hydraulic press comprising, in combination, upright cylinder means having a lower end adapted to be fixedly mounted on a floor and an upper end; a piston reciprocable in said cylinder means; a stationary tool fixedly mounted on the upper end of said cylinder means; a movable tool arranged opposite said stationary tool; and connecting means connecting said piston to said movable tool for reciprocating the latter toward and away from said stationary tool during reciprocation of said piston, said cylinder means forming the only support of said hydraulic press, said connecting means including a tubular member slidably guided on said cylinder means.

4. A hydraulic press comprising, in combination, upright cylinder means having a lower end adapted to be fixedly mounted on a floor and an upper end; a piston reciprocable in said cylinder means; a stationary tool fixedly mounted on the upper end of said cylinder means; a movable tool arranged opposite said stationary tool; and connecting means connecting said piston to said movable tool for reciprocating the latter toward and away from said stationary tool during reciprocation of said piston, said cylinder means forming the only support of said hydraulic press, said connecting means including a tubular member slidably guided on said cylinder means and a yoke-shaped member fixed to the upper end of said tubular member and having a transverse portion spaced from and above said stationary tool and carrying said movable tool.

5. A hydraulic press comprising, in combination, upright cylinder means having a lower end adapted to be fixedly mounted on a floor and an upper end; a piston reciprocable in said cylinder means; a stationary tool fixedly mounted on the upper end of said cylinder means; a movable tool arranged opposite said stationary tool; connecting means connecting said piston to said movable tool for reciprocating the latter toward and away from said stationary tool during reciprocation of said piston, said cylinder means forming the only support of said hydraulic press, said connecting means including a tubular member slidably guided on said cylinder means and a yoke-shaped member fixed to the upper end of said tubular member and having a transverse portion spaced from and above said stationary tool and carrying said movable tool; a pair of additional tools arranged spaced from each other transverse to the direction of reciprocation of said movable tool between the latter and said stationary tool; guide means mounted on said upper end of said cylinder means for guiding said additional tools for movement toward and away from each other; and means on said yoke and engaging said additional tools for moving the same toward each other during movement of said yoke in one direction.

6. A hydraulic press comprising, in combination, upright cylinder means having a lower end adapted to be fixedly mounted on a floor and an upper end; a piston reciprocable in said cylinder means; a stationary tool fixedly mounted on the upper end of said cylinder means; a movable tool arranged opposite said stationary tool; connecting means connecting said piston to said movable tool for reciprocating the latter toward and away from said stationary tool during reciprocation of said piston, said cylinder means forming the only support of said hydraulic press, said connecting means including a tubular member slidably guided on said cylinder means and a yoke-shaped member fixed to the upper end of said tubular member and having a transverse portion spaced from and above said stationary tool and carrying said movable tool; a pair of additional tools arranged spaced from each other along a common axis extending transverse to the direction of reciprocation of said movable tool between the latter and said stationary tool, said additional tools having respectively outer ends having convexly curved end faces; guide means mounted on said upper end of said cylinder means for guiding said additional tools for movement toward and away from each other; and a pair of roller means turnably mounted on said yoke and respectively engaging said convexly curved end faces of said additional tools for moving the latter toward each other during movement of said yoke in one direction.

7. A hydraulic press comprising, in combination, an upright standard having a lower foot part adapted to be mounted on a floor and an upper part in form of a hollow cylinder having opposite closed ends; a piston reciprocable in said cylinder; a stationary tool mounted on the upper end of said cylinder; a movable tool arranged opposite said stationary tool; and connecting means including a tubular member slidably guided on the outer surface of said cylinder for connecting said piston to said movable tool for reciprocating the latter toward and away from said stationary tool during reciprocation of said piston, said standard forming the only support of said hydraulic press.

8. A hydraulic press comprising, in combination, an upright standard having a lower foot part adapted to be mounted on a floor and an upper part in form of a hollow cylinder having opposite closed ends, said standard being formed in said foot part thereof with a transverse opening therethrough arranged below the lower end of said cylinder; a piston reciprocable in said cylinder; a piston rod connected to said piston and projecting outwardly of said cylinder through an opening formed in the lower end of the latter; a stationary tool mounted on the upper end of said cylinder; a movable tool arranged opposite said stationary tool; and connecting means including a tubular member slidably guided on the outer surface of said cylinder, a cross bar extending through said opening in said foot part and connecting the lower end of said piston rod to the lower end of said tubular member, and a yoke-shaped member fixed to the upper end of said tubular member upwardly projecting therefrom and having a transverse portion spaced from and above said stationary tool and carrying said movable tool so that the latter is reciprocated toward and away from said stationary tool during reciprocation of said piston, said standard forming the only support of said hydraulic press.

References Cited by the Examiner
UNITED STATES PATENTS

| 336,604 | 2/86 | Tweddell | 78—42 |
| 444,547 | 1/91 | Samuels | 78—15 |
| 1,428,219 | 9/22 | Crawford | 78—15 |
| 1,474,882 | 11/23 | Baumgarten | 153—13 |
| 1,994,725 | 3/35 | Offutt | 153—48 |

FOREIGN PATENTS

| 444,480 | 5/27 | Germany. |

WILLIAM J. STEPHENSON, *Primary Examiner.*
CHARLES W. LANHAM, *Examiner.*